Figures 1, 2:
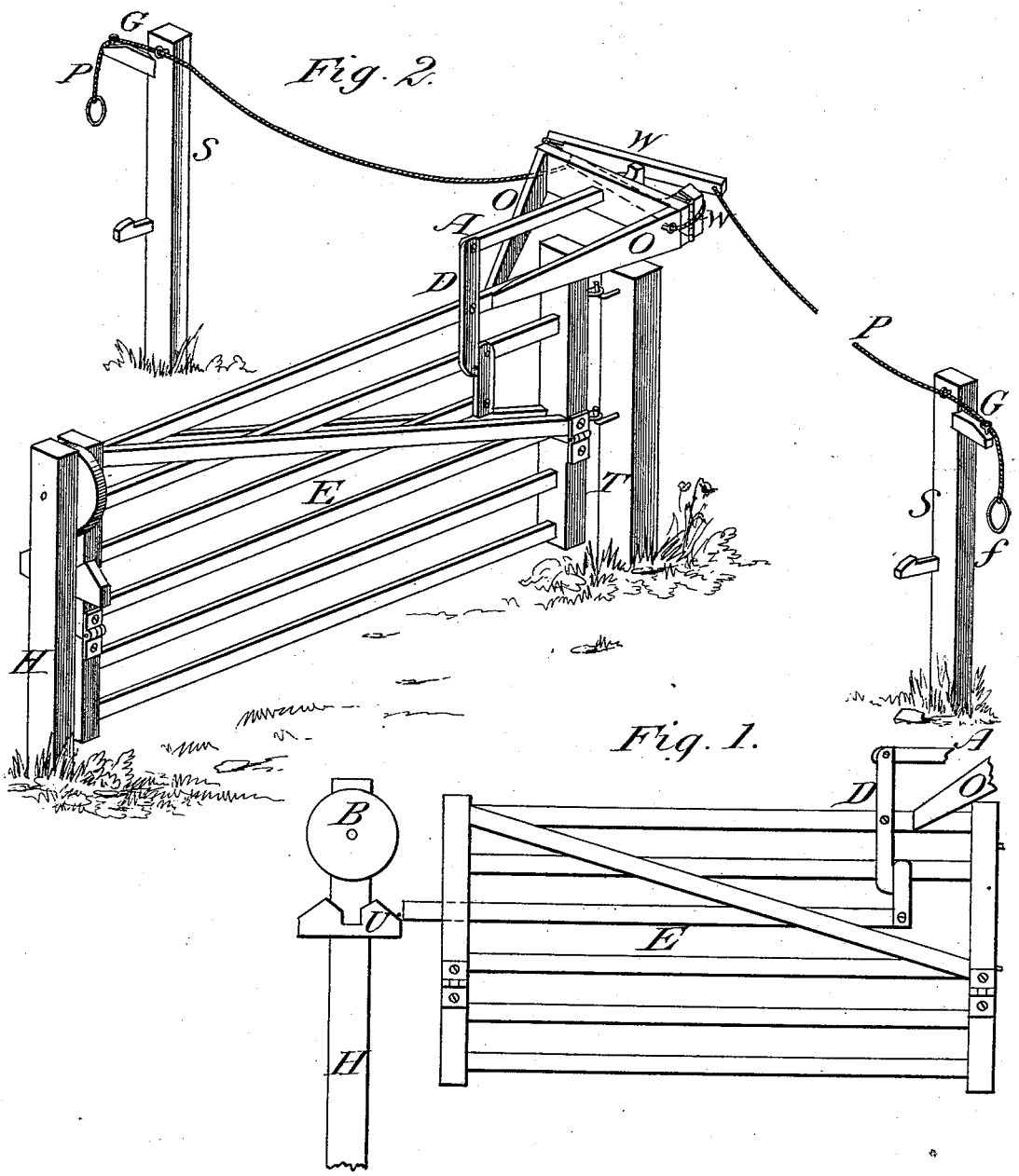

J. COFFITS.
Farm-Gate.

No. 208,225. Patented Sept. 24, 1878.

Attest:
Geo Chopple
Mary F. Smith

Inventor:
John Coffits

006# UNITED STATES PATENT OFFICE.

JOHN COFFITS, OF CENTRAL CITY, IOWA.

IMPROVEMENT IN FARM-GATES.

Specification forming part of Letters Patent No. 208,225, dated September 24, 1878; application filed June 27, 1878.

*To all whom it may concern:*

Be it known that I, JOHN COFFITS, of Central City, in the county of Linn and State of Iowa, have invented a new and useful Improvement in Farm-Gates, which improvement is fully set forth in the following specification, reference being had to the accompanying drawing.

The object of my invention is to conveniently and rapidly unlatch and swing on its hinges in a reversible manner a gate, by means of ropes or their equivalent, without alighting from a horse or vehicle, and which can be again closed and latched in like manner, by the combination, in a gate, of a slide-bar, A, connected with latch E by lever D, and operated by ropes P P or their equivalent, adjusted to arms O O, as shown in the perspective view, Figure 1, of the accompanying drawing.

The gate is illustrated more in detail in the side view, Fig. 2. The ropes are attached to the wings W W, which are hung to arms O O in a transverse manner across the end of slide-bar A, supported by posts S S, and extended within reach by means of arms G G in an obtuse angle, and is made to open by the pressure of the ropes or wings at the end of bar A by pulling the rope at *f*, and closed again by rope at opposite post, and vice versa. The gate is swung to a post, T, set in the ground, and latched by means of an elongated notch or receiver, *u*, at post H, and secured by the latch resting in the notch; and for the greater safety in case of storm, when the gate is open it is latched at post S in like manner as at post H.

As the operator drives up to the gate, he halts at the rope on the side he approaches, and, with a steady pull at the rope, the gate opens, and the latch is thrown into the notch at the opposite post. Advancing on and through the gate to the next rope, another halt is made, and with another pull at the rope the gate is again closed.

By means of the rope the latch is raised out of the notch, and at the same time the gate is swung around, and by the same process repeated at the opposite side the gate is again adjusted in its proper place, all without the loss of time or the trouble of alighting. The receiving block or notch is so constructed that the latch is forced into the notch by means of a circular piece of wood or wheel, thus preventing the possibility of failure in closing the gate.

It will be evident that the invention may be applied to any large or farm gate by adding the arms, slide-bar, lever, latch, wings, and ropes, together with the receiving-notch.

I claim as my invention—

The combination, in a gate, substantially as described, of a slide-bar, A, pivoted lever D, latch E, arms O, with wings W and ropes P for opening and closing, and also notch-block *u* and wheel B, with which to fasten the gate.

JOHN COFFITS.

Witnesses:
 J. A. SMITH,
 J. B. MCQUEEN.